Feb. 3, 1948.   H. E. HALL   2,435,350
HARVESTER WITH TOPPER AND EJECTOR
Filed Oct. 26, 1944   3 Sheets-Sheet 2
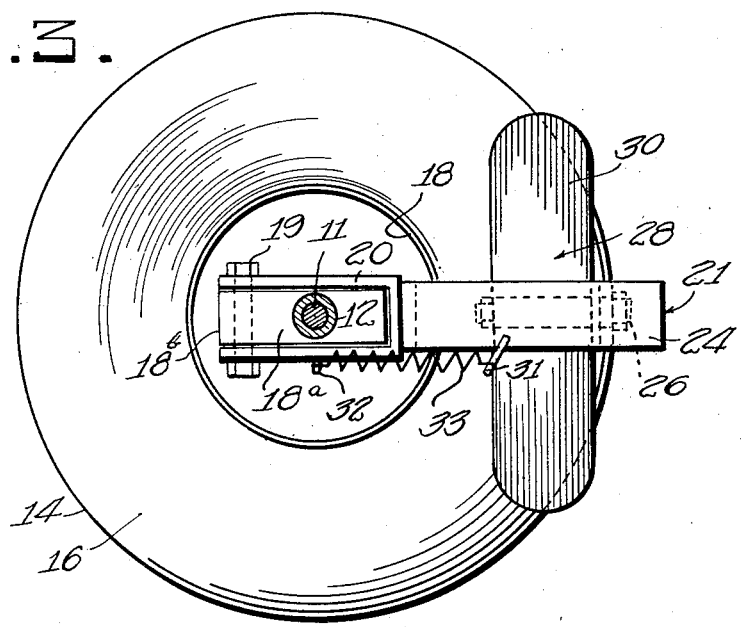
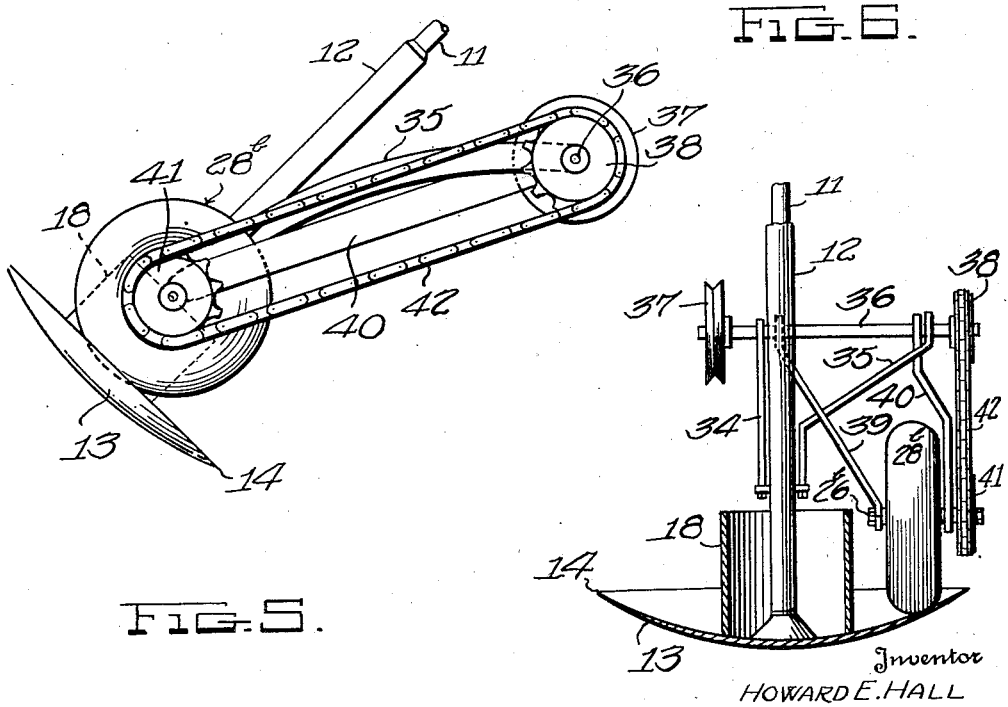
Inventor
HOWARD E. HALL
By Miller & Miller
Attorneys

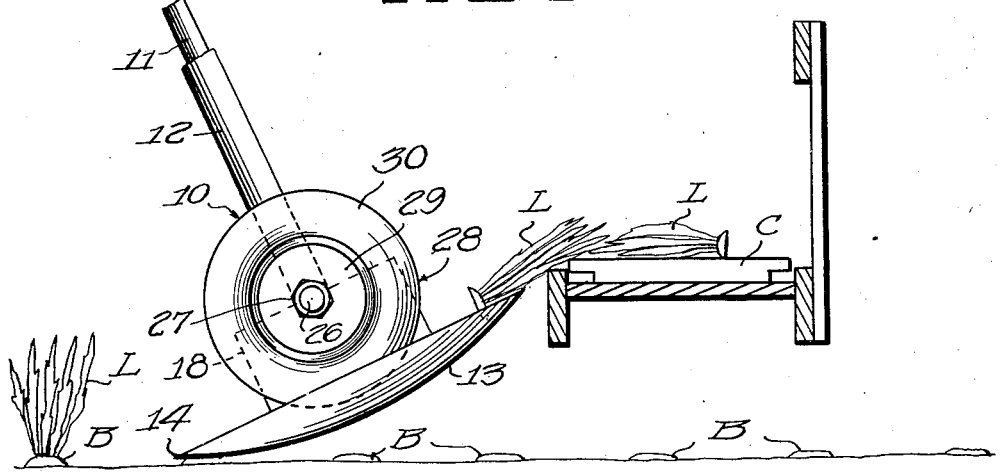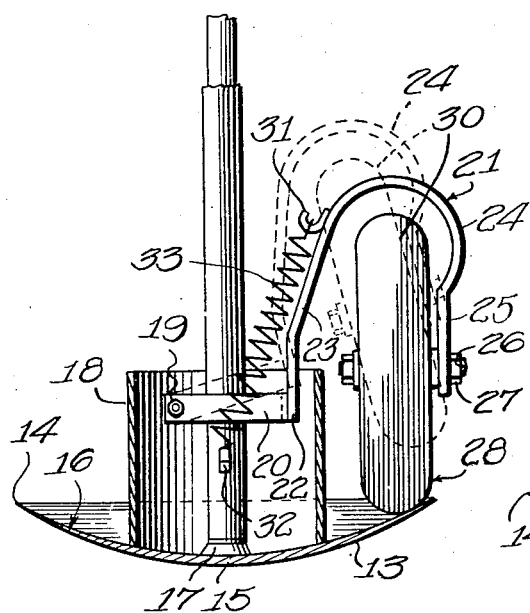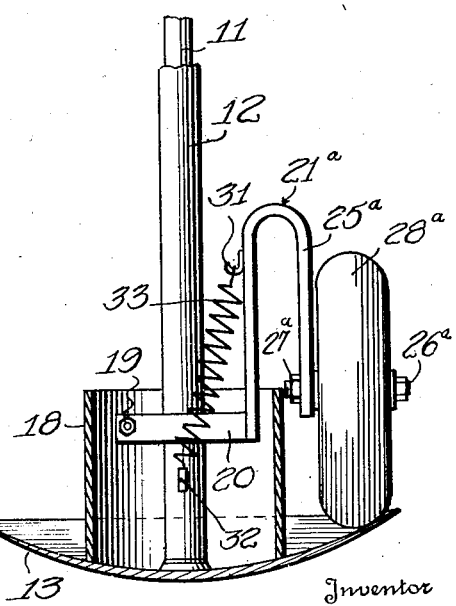

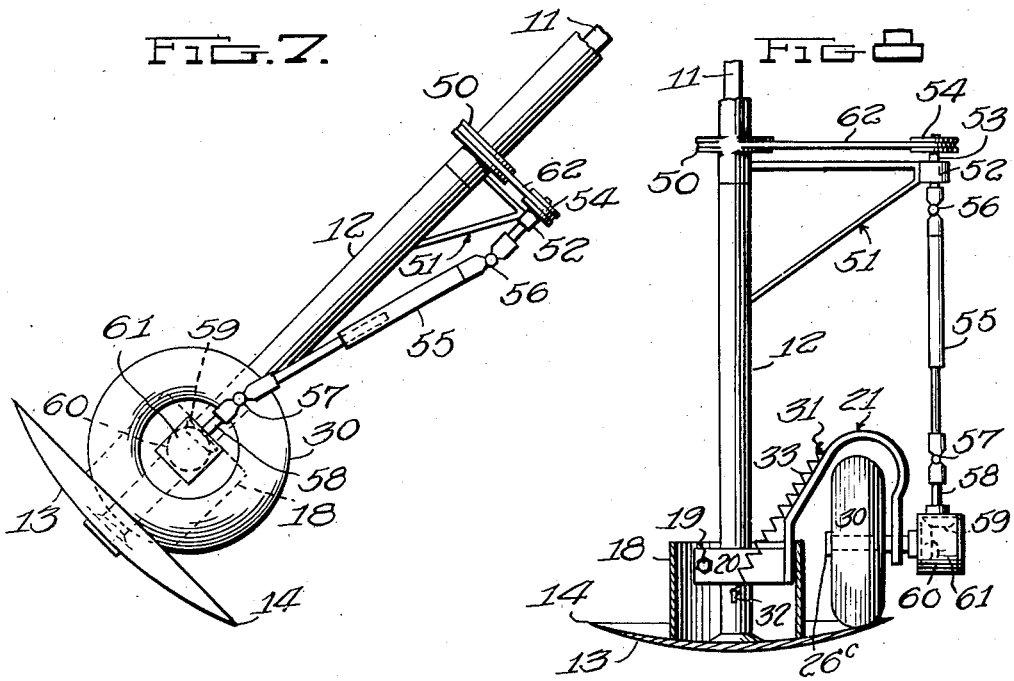
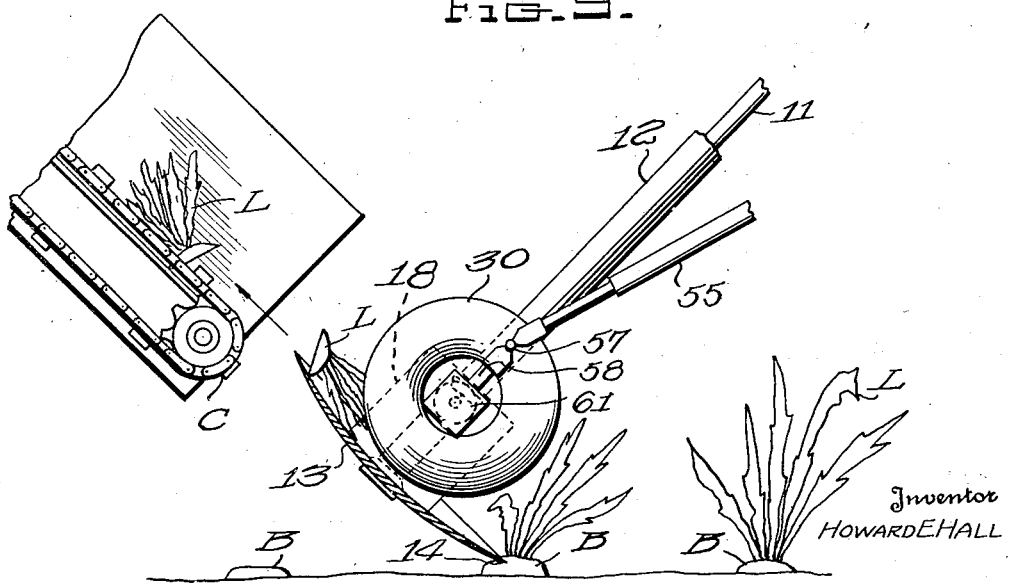

Patented Feb. 3, 1948

2,435,350

UNITED STATES PATENT OFFICE 2,435,350

HARVESTER WITH TOPPER AND EJECTOR

Howard E. Hall, Boise, Idaho, assignor to J. A. Terteling & Sons, Boise, Idaho, a partnership consisting of J. W. Terteling and N. L. Terteling Application October 26, 1944, Serial No. 560,412

5 Claims. (Cl. 55—107)

The instant invention relates to harvesters and more particularly to an ejector device for beet harvesters and the like.

One of the primary objects of the invention is the construction of an improved ejector mechanism capable of effectively preventing the accumulation of the leaves as the same are severed from the beets in the ground, thereby preventing clogging and stoppage of the severing discs, as well as protecting the lifting device for the beets which follows the severing discs.

Still a further aim is the making of an ejector mechanism of the type specified which transfers the topped beet leaves to one side of the beet harvester or the like or deposits said leaves onto a conveyor to be transferred either to a windrow or direct to a truck or other vehicle.

Yet another purpose is the fabrication of an ejector mechanism embodying as one of its features a rubber tired or similar wheel, either power or frictionally driven, in which the contact between the severing disc and tire is either spring or gravity held.

A yet further object is the construction of an ejector device which in addition to disposing of the beet leaves or tops acts as a cleaning means serving to maintain the cutting disc free and clear of soil, mud or other obstructing material.

The above and other aims and objects will be apparent from the detailed description hereinafter appearing when taken in conjunction with the appended drawings in which Fig. 1 is a side elevational view of the improved ejector mechanism forming part of a beet harvester, and showing beets being topped and the leaves or tops being transferred to a conveyor;

Fig. 2 is a front elevational view, partly in section, of the ejector mechanism shown in Fig. 1 and showing in dotted lines how the ejector wheel may move with respect to the cutting disc;

Fig. 3 is a plan view on an enlarged scale of the ejector mechanism of Figs. 1 and 2;

Fig. 4 is a view similar to Fig. 1 but showing a modified form of wheel-supporting bracket;

Fig. 5 is a side elevational view of a modified form of ejector mechanism in which the ejector wheel is positively driven;

Fig. 6 is a rear elevational view, partly in section, of the form of invention shown in Fig. 5;

Fig. 7 is a side elevational view of a still further modified form of the invention showing a different type of positive drive for the ejector wheel;

Fig. 8 is a front elevational view, partly in section, of the form of invention shown in Fig. 7; and Fig. 9 is a view similar to Fig. 1 showing the form of the invention of Figs. 7 and 8 in operation.

Referring first to Figs. 1, 2 and 3, the reference numeral 10 designates the ejector mechanism as a whole, which is shown as transferring leaves or tops L from a row of beets B to the conveyor belt C, the novel ejector mechanism 10 and the conveyor belt C all forming a part of a conventional beet harvesting or similar machine.

The ejector mechanism 10 comprises a rotatable drive shaft 11 driven in any suitable manner by the harvester operating mechanism, said shaft having a hollow, cylindrical, non-rotating sleeve or housing 12 coextensive therewith. A thin, circular disc 13, which may be flat but is preferably concavo-convex as shown and having a cutting edge 14, is fixed at the center 15 of its concave side 16 to the lower end 17 of drive shaft 11, whereby the disc is rotated by said shaft.

A cylindrical, frustro-conical or similar annular hollow housing 18 is rigidly secured to the concave side 16 of the disc 13 for rotation therewith for a purpose to be referred to hereinafter. Fastened to non-rotatable sleeve 12 within housing 18 is a substantially rectangular stationary bearing block 18a. A U-shaped bracket 20 is pivotally secured to bearing block 18a at one end thereof as at 18b by means of a transverse bolt 19 or the like acting as a fulcrum. A wheel-supporting bracket 21 is attached at 22 to U-bracket 20, the former having an upwardly extending arm 23, a curved connecting portion 24 and a short arm 25 projecting downwardly from portion 24 exteriorly of housing 18. Secured to the end of short arm 25 as at 27 is a stub axle 26, said axle rotatably supporting a wheel 28, the rim 29 of which carries a conventional cushion rubber, pneumatic or similar type of resilient tire 30. Fastened to long arm 23 is a hook 31 and a similar hook 32 is fastened to sleeve 12. A tensioning spring 33 is secured at its end to said hooks as will be clearly seen in Figs. 2 and 3 of the drawings. Spring 33 serves to maintain frictional contact between tire 30 and disc 13 whereby the wheel 28 is rotated upon rotation of the shaft 11 and said disc. The action of the ejector mechanism 10 will now be apparent. As the harvester moves through the field being harvested, the rotating cutting disc 13 will top the rows of beets B and the leaves or tops L will be efficiently transferred by wheel 28 to its tire 30 to conveyor C or the like. At the same time the cutting disc is kept clean of mud and dirt and the spring 33 maintains proper frictional contact between the tire and disc, while the housing 18 protects the bearing 18b and associated parts from injury by rocks, stones, clods or the like. The wheel 28 may rise or be raised from the disc 13 against action of spring 33 by movement about fulcrum 19 to the position shown in dotted lines in Fig. 2.

In Fig. 4 there is shown a modified form of wheel-supporting bracket 21a in which the arm 25a is connected to the stub axle 26a at point 27a interiorly of wheel 28a, in lieu of exteriorly as in the form of the invention illustrated in Figs. 1, 2 and 3.

Turning now to the form of the invention shown in Figs. 5 and 6, the reference numeral 11 designates the drive shaft, 12 the sleeve, 13 the cutting disc, 18 the housing, all as in the preceding figures of the drawing. However, in this modified construction a pair of spaced bracket members 34 and 35 are rigidly secured to non-rotatable sleeve, said members rotatably supporting a wheel driving shaft 36 which has a pulley or sheave 37 keyed thereto at one end and a sprocket 38 keyed to the opposite end thereof. A pair of spaced depending bracket supports 39 and 40 are journaled on shaft 36, said bracket supports having a wheel stub axle 26b journaled adjacent the lower ends thereof, said axle carrying a pneumatic or like tired wheel 28b. A sprocket 41 is bolted to the outer extremities of stub axle 26b, sprockets 38 and 41 being operatively joined by endless sprocket chain 42. It will now be seen that rotation of sheave 37 will through shaft 36, sprockets 38 and 41 produce positive rotation of wheel 28b thus replacing rotation through frictional contact as in Figs. 1 to 4, inclusive.

A final modified form of the invention is illustrated in Figs. 7, 8 and 9. Here again the reference characters 11 designate the rotatable shaft, 12 stationary sleeve, 13 cutting disc, 18 housing, 21 wheel-supporting bracket, 30 pneumatic or like tire rotatable on a stub shaft 26c. Keyed to shaft 11 for rotation therewith is a sheave or pulley 50, while stationary sleeve 12 mounts a triangular supporting bracket 51 having a bearing 52 at the apex thereof. A short shaft 53 is journaled in bearing 52, one end of the shaft having a pulley 54 keyed thereto, while the other end of shaft 53 is secured to a telescopically adjustable drive shaft 55 as by a universal joint 56. Drive shaft 55 has a second universal joint 57 for attachment to a second short shaft 58, the latter having a gear 59 meshing with a gear 60 fixed to stub shaft 26c, said gears being encased in gear housing 61. An endless belt 62 connects sheaves or pulleys 50 and 54. It will now be appreciated that this form of the invention combines both the frictional and positive drives for the ejector wheel shown in the previous figures of the drawing and heretofore described.

From the above it will be seen that there has been provided an ejector mechanism well adapted to perform its intended function and in which the ejector wheel may be either frictionally or positively driven or both. It will be further understood that various changes may be made in the specific embodiment shown as will be apparent to those skilled in the art. It is contemplated to cover all such and to be limited in this respect only as may be necessary by the scope of the claims hereto appended.

What I claim and desire to secure by Letters Patent is:

1. An ejector mechanism for a beet harvester or the like comprising a rotatable shaft, a cutting disc secured to the end of said shaft for rotation therewith, a stationary sleeve surrounding said shaft, a support pivotally secured to said sleeve adjacent said shaft end, a rubber tired wheel rotatably mounted on said support, and spring means connecting said support and sleeve for resiliently holding said wheel in contact with the inner face of said disc.

2. An ejector mechanism for a beet harvester or the like comprising a rotatable shaft, a cutting disc secured to the end of the shaft for rotation therewith, a stationary sleeve surrounding said shaft, a support pivotally secured to said sleeve adjacent said shaft end, a rubber tired wheel mounted on said support and rotatably resting on said disc, and means carried by said sleeve to positively drive said wheel.

3. An ejector mechanism for a beet harvester or the like comprising a rotatable shaft, a cutting disc secured to the end of the shaft for rotation therewith, a stationary sleeve surrounding said shaft, a support pivotally secured to said sleeve adjacent said shaft end, a rubber tired wheel mounted on said support, spring means connecting said support and sleeve, and means carried by said sleeve to positively drive said wheel.

4. The structure of claim 2, said drive means comprising a pulley secured to said rotatable shaft, a second pulley carried by said support, a belt connecting said pulleys, and shafts having universal joints connecting said support pulley to said wheel.

5. The structure of claim 3, said drive means comprising a pulley secured to said rotatable shaft, a second pulley carried by said support, a belt connecting said pulleys, and shafts having universal joints connecting said support pulley to said wheel.

HOWARD E. HALL.

REFERENCES CITED

The following references are of record in the file of this patent:

UNITED STATES PATENTS

| Number | Name | Date |
| --- | --- | --- |
| Re. 12,708 | Heilig | Oct. 29, 1907 |
| 1,480,270 | Kopitke | Jan. 8, 1924 |
| 1,635,494 | Moreau | July 12, 1927 |
| 2,102,379 | Nutter | Dec. 14, 1937 |

FOREIGN PATENTS

| Number | Country | Date |
| --- | --- | --- |
| 20,152 | Czechoslovakia | Nov. 25, 1926 |